United States Patent Office 3,514,319
Patented May 26, 1970

3,514,319
BEARING ELEMENTS CARRYING A CERAMIC COATING
Toshio Hata, % Kobayashi, 789 3-chome, Magome-Higashi, Ota-ku, Tokyo, Japan, and Keimin Kawasaki, 8-7 2-chome, Sanno, Ota-ku, Tokyo, Japan
Filed May 25, 1966, Ser. No. 552,830
Int. Cl. B44d 1/097, 1/34; C23d 5/04
U.S. Cl. 117—105.2         4 Claims

ABSTRACT OF THE DISCLOSURE

A bearing element is provided formed on an iron-base metal and carrying on its surface a film of a material consisting primarily of molybdenum trioxide and small percentages of materials from the group comprising calcium fluoride, lead oxide, triiron tetraoxide, or the like.

Figure 1:
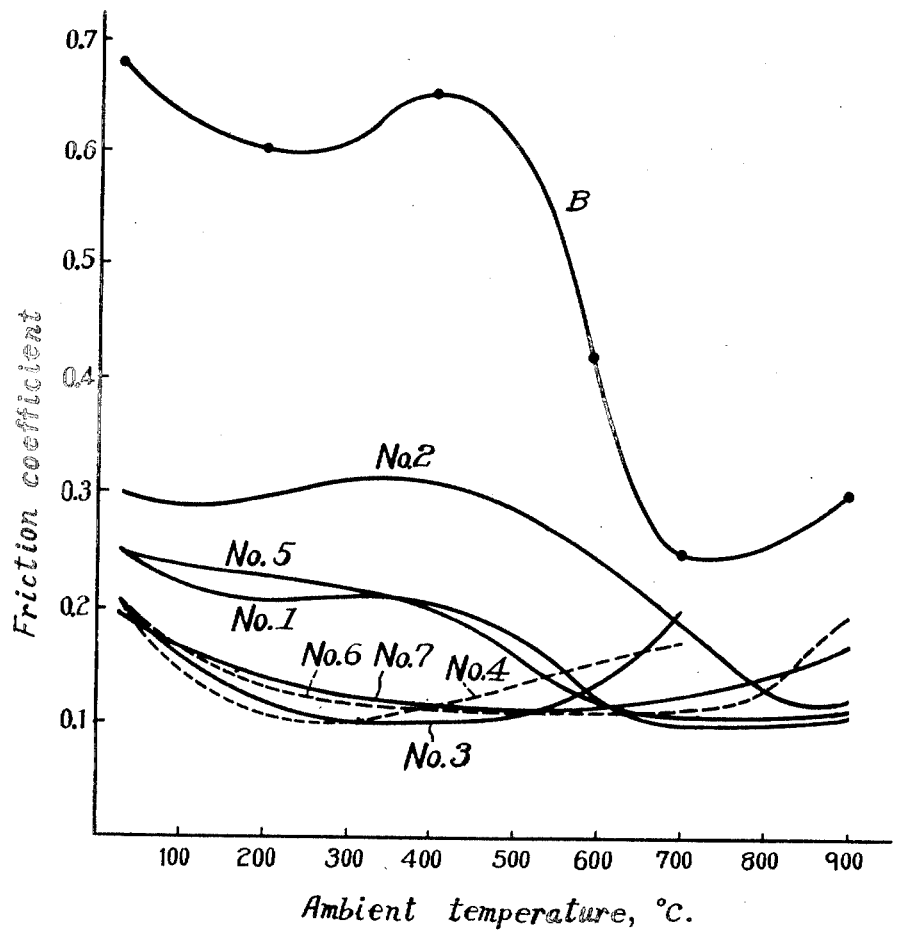

This invention relates to bearing elements in different mechanical structures and more particularly to those of iron-base metal usable as high-temperature sliding parts of spacecraft, ball bearings in jet engines, cylinder liners of diesel and gasoline engines and other heat and corrosion-resistant parts.

The present invention has for its primary object to provide a bearing element of iron-base metal carrying on its surface a spray-coated ceramic film of molybdenum trioxide or a material comprising molybdenum trioxide as a major ingredient and an appropriate compound or compounds as additives thereto.

Previously, solid lubricants such as graphite and molybdenum disulfide have been in use for lubrication of bearing and other sliding elements used at high temperatures. At temperatures of several hundreds degrees centigrade or over, however, these lubricants, undergo heavy oxidation and rapid consumption and the lubricant films can have only a very limited service life. Particularly, molybdenum disulfide cannot be used at an environmental temperature of approximately 400° C. or over to any satisfaction because of oxidation of the lubricant.

In a series of researches conducted by the inventors on molybdenum compounds as lubricants usable at high temperatures, it has been found that spray-coated films of molybdenum trioxide exhibit highly excellent friction- or wear-resistant properties not only at elevated temperatures but also at room temperatures.

In general, the weakest point of bearing elements coated with a solid lubricant film has been that, it has not any practical self-restoring ability and thus once worn out or broken it cannot be expected to return to its normal serviceable condition. For practical use, therefore, it is extremely important that the solid lubricant film exhibits a high wear resistance as well as a limited friction coefficient and withstands oxidation at high temperatures. The practicability of bearing elements carrying a solid lubricant film would be largely lost if the life of the film be short however low its friction coefficient is. In contrast, the bearing element of iron-base metal carrying a spray-coated ceramic film according to the present invention exhibits a highly excellent wear-resistance characteristic in the range of environmental temperature of from room temperature to approximately 800° C.

Some examples of powder material usable according to the present invention to form ceramic coatings are listed in Table 1, in which the compositions of specimens Nos. 1 to 8 are shown in percentage by weight.

TABLE 1

| Specimen No. | Ingredients | | | | | | | |
|---|---|---|---|---|---|---|---|---|
| | MoO$_3$ | ZrO$_2$ | V$_2$O$_5$ | CaF$_2$ | PbO | Fe$_3$O$_4$ | SiO$_2$ | AlPO$_4$ |
| 1 | 100 | | | | | | | |
| 2 | 90 | 10 | | | | | | |
| 3 | 85 | | 10 | | | | 5 | |
| 4 | 85 | | 10 | | | | | 5 |
| 5 | 90 | | | 10 | | | | |
| 6 | 90 | | | | 10 | | | |
| 7 | 80–85 | | | | | 10 | 10–5 | |

Next, the process of forming a ceramic film on the surface of iron-base metal by use of the powder materials and the effects of different additive ingredients listed in Table 1 will be described in detail.

A disc, for example, of stainless steel (Japanese Industrial Standard SUS 27), 90 mm. in diameter and 5 mm. in thickness, is preheated to a temperature between 900° C. and 1000° C. in the atmospheric air. The No. 1 powder material is sprayed on the surface of the disc by use of an oxyacetylene flame sprayer while slowly rotating the stainless steel disc to form a ceramic film on its surface. After the desired film has been formed and the powder supply terminated, the flame is further applied to the disc surface for a little while to burn the film layer. The stainless disc thus spray-coated is left to cool to the room temperature and then the ceramic coating thereon is polished to obtain a bearing element carrying a ceramic film of approximately 0.02 mm. thickness.

The sprayed ceramic film, even when formed of molybdenum trioxide alone, exhibits an extremely high, excellent wear-resistance characteristic but involves a deficiency that the adhesion of the spray-deposited material to the support of iron-base metal material is more or less unsatisfactory and thus the film exhibits only an unsufficient wear resistance particularly at lower temperatures. In cases where the spray-deposited film is firmly joined to the base metal, any substantial reduction in wear resistance can be avoided as long as relatively high spraying skill is available. In this connection, it has been found that the spraying operation can be markedly facilitated by use of a spraying material comprising MoO$_3$ powder and an appropriate additive compound or compounds. The addition of such compounds to the spraying material is generally desirable even at the sacrifice of some or other characteristics of the bearing element to be obtained by the spraying of such material. Moreover, it has been found that certain types of additive give desirable performance characteristics to the spray-coated product which cannot be obtained by use of a spraying material comprising molybdenum trioxide alone.

Description will next be made on the effects of the different additives contained in the materials, Nos. 2 to 8, listed in Table 1.

The additive, zirconium oxide, used in No. 2 material is stable against acids other than fluoric and concentrated sulfuric acids and particularly against alkalis. Addition of 10% or thereabouts of ZrO$_2$ is effective to improve the corrosion resistance of the ceramic film obtained. As for the friction coefficient of the ceramic film and its upon the co-operating element, No. 2 material is substantially the same as No. 1 material including molybdenum trioxide alone, though only a little inferior to the latter. As for the life of the film, No. 2 material rather excels No. 1 material. However, addition of ZrO$_2$ in excess of 20% should be avoided as it not only impairs the performances of the product but causes some difficulty in the spraying operation.

Addition of vanadium oxide, $V_2O_5$, in Nos. 3 and 4 materials is effective to improve the corrosion resistance of the ceramic film like the additive $ZrO_2$ in No. 2 material, but tends to reduce the friction coefficient of the film at relatively low temperatures of the surrounding atmosphere even when only 3 to 4%, by weight, of $V_2O_5$ is added. Another disadvantage of this additive is that it considerably reduces the service life of the film at high temperatures. To obtain an improved corrosion resistance and facilitate the spraying operation, from 15 to 20%, by weight, of $V_2O_5$ should be added but any excessive amount of this additive is harmful aggravating its disadvantages pointed out above. The $V_2O_5$ content in the spraying material, should thus be limited to 15% or under.

Another additive, silicon dioxide, in No. 3 material serves to enhance the strength of the ceramic film obtained and, when used together with vanadium oxide, $V_2O_5$, is effective to improve the adhesion characteristics of the film to the base metal while serving to extend the film life under high-temperature conditions. At most, only 5% by weight of $SiO_2$ is required to serve the purpose of improving the strength and adhesion characteristic of the film and, even in cases where another effect of $SiO_2$, i.e. of imparting a corrosion-resistant property to the film, is desired, the amount of $SiO_2$ added to the spraying material is preferably limited to 10% by weight or under. Addition of $SiO_2$ in any excessive amount has an adverse effect upon the bearing performance of the ceramic film as some of the added $SiO_2$ remains isolated therein.

Calcium fluoride, $CaF_2$, in No. 5 material is effective to expedite the spraying operation while enhancing the wear resistance of the film. In other words, addition of an appropriate amount of $CaF_2$ improves the stability of the film under repeated friction, minimizing the change in friction coefficient at the same given temperature. This advantageous effect can be obtained sufficiently even by addition of only a few percent of $CaF_2$. Addition of $CaF_2$ to the $MoO_3$ material in any excess of 10% by weight would rather cause difficulties in the spraying operation.

Lead oxide, PbO, used in Nos. 6 and 7 materials has the effect of enhancing the adhesion characteristic of the sprayed film while expediting the spraying operation. A few percent by weight of this additive is sufficient to obtain this effect but it is most desirable to use this additive in an amount of approximately 10% by weight in order to obtain a further effect of reducing the friction coefficient in the low temperature range as obtainable with addition of $V_2O_5$. Moreover, unlike $V_2O_5$, PbO causes only an extremely limited reduction or substantially no reduction in service life of the film obtained even in such a high temperature range of from 700° C. to 800 C. In comparison with the sprayed ceramic film of the material including molybdenum trioxide alone, the one formed of the spraying material including PbO added in an amount of approximately 10% by weight excels in both friction coefficient and wear resistance characteristic in the temperature range of from room temperature to approximately 700° C. but the former excels in film life in the temperature range of from 700° C. to approximately 800° C. If added in excess of 10% by weight, for example, in an amount of 20% by weight, PbO would cause a marked reduction in film life though the two effects of expediting the spraying operation and reducing the friction coefficient of the film are maintained.

Triiron tetroxide, $Fe_3O_4$, is effective, particularly when added together with PbO, to highly improve the adhesion of the sprayed film to the base metal and to expedite the spraying operation. This additive also gives a film life which is stable in a wide temperature range including both low and high temperatures, but involves a disadvantage that it increases the friction coefficient to a more or less extent. It is to be added in an amount between 5 to 10% by weight with a view to minimizing the increase in friction coefficient though it may be added in amounts of up to 10 or 15% by weight with substantial success.

The additive, $AlPO_4$, used in No. 4 material has substantially the same effect as $SiO_2$ and in combination with $V_2O_5$ serves to improve the adhesion characteristic and service life of the film obtained but, unlike $SiO_2$, has no effect of improving the corrosion resistance of the film. On the other hand, aluminum orthophosphate adversely affects the film performances only to a limited extent compared with $SiO_2$ even when added in more or less increased amounts with the intention of improving the adhesion characteristic and service life of the film. This additive compound is to be added in an amount of 15% by weight or less.

The results of performance tests conducted on bearing elements carrying sprayed ceramic films according to the preesnt invention will next be described. The test conditions were as follows:

Testing machine: Pin-on-disc type friction and wear tester.

Ambient temperature: From room temperature to 900° C.

Sliding speed: 210 m./min.

Load: 1000 grams.

Test pieces: Circular discs of stainless steel (JIS SUS 27), 90 mm. dia. and 5 mm. thick, spray-coated to the thickness of 0.02 mm. with different materials listed in Table 1. The coated disc surface was washed clean with petroleum benzene before testing.

Opposing piece: Round bar of highspeed steel (JIS SKH–4A), 8 mm. dia., rounded at the end in a radius of 4 mm. and hardened to a Brinell hardness of from 240 to 245.

Table 2 shows the friction coefficient and the life of the films of materials Nos. 1 to 8 in Table 1, spray-coated on the test pieces. The testing was conducted at 25° C. and 660° C.

TABLE 2

| Specimen No. | Friction coefficient | | Film life, rubbing cycles | |
|---|---|---|---|---|
| | 25° C. | 660° C. | 25° C. | 660° C. |
| 1 | 0.25 | 0.12 | 5.5×10⁵ | 1×10⁶ |
| 2 | 0.25 | 0.11 | 7.0×10⁵ | 1×10⁶ |
| 3 | 0.20 | 0.10 | 8.0×10⁵ | 8×10⁵ |
| 4 | 0.23 | 0.11 | 8.0×10⁵ | 7×10⁵ |
| 5 | 0.20 | 0.09 | 5.0×10⁵ | Over 1×10⁶ |
| 6 | 0.30 | 0.20 | 6.0×10⁵ | Over 1×10⁶ |
| 7 | 0.21 | 0.18 | 1.0×10⁵ | Over 1×10⁶ |

The graphical representation of FIG. 1 illustrates the change in friction coefficient of the test pieces coated with materials Nos. 1 to 7 listed in Table 1 when the ambient temperature was changed from the room temperature to 900° C. For comparison, curve B shows the change in friction coefficient of stainless steel carrying no spray-coated film.

Figure 2:
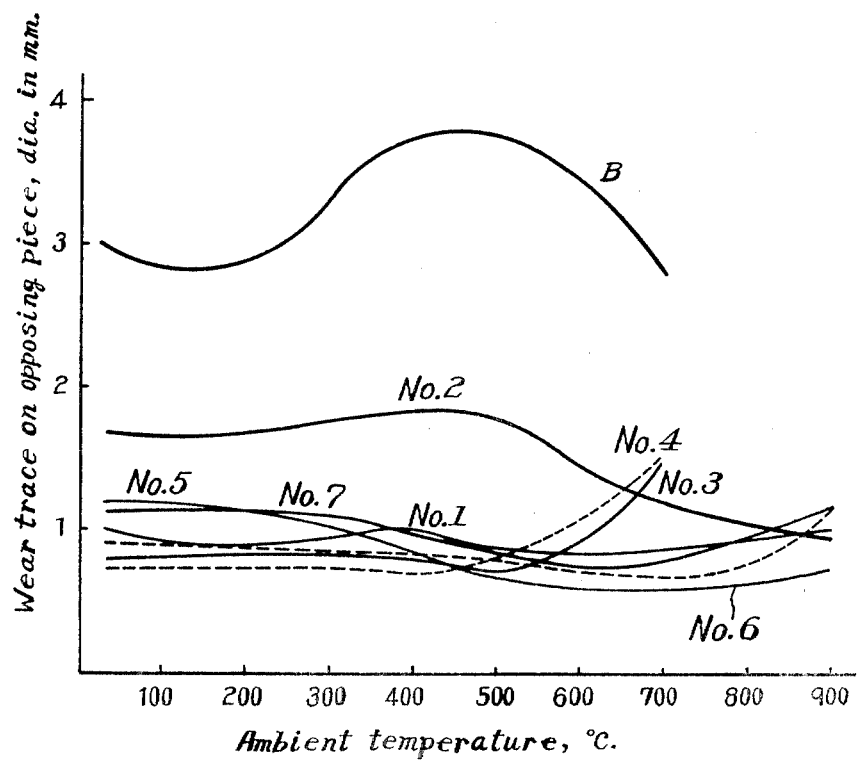

The curves Nos. 1 to 7 in FIG. 2 show the change in wearing effect of the respective spraying materials upon the opposing piece (JIS SKH–4A) as measured over the same range of ambient temperature as in FIG. 1. The curve B illustrates the behaviour obtained with non-coated stainless steel.

Figure 3:
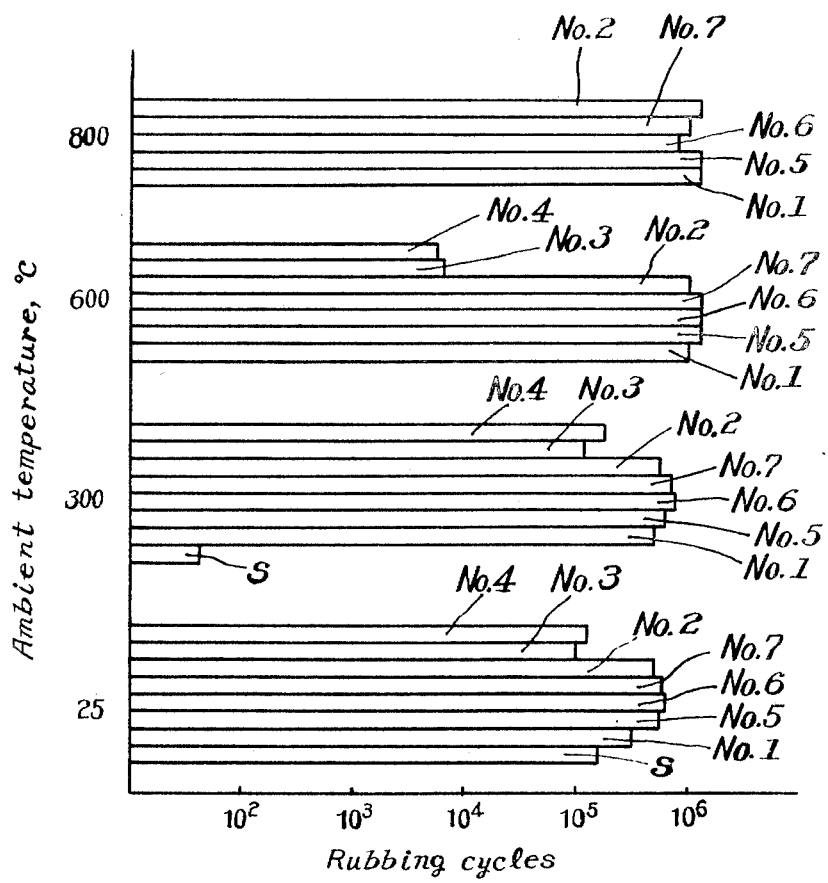

FIG. 3 illustrates the results of the film life tests conducted at different ambient temperatures of 25° C., 350° C., 660° C. and 800° C. with materials Nos. 1 to 7. The film life is shown in number of rubbing cycles. For comparison, the data obtained with a previously known film material, molybdenum disulfide, are shown in FIG. 3, as indicated by character S. The material with an appropriate bonding agent added was coated on the surface of stainless steel pieces and burned to form a solid lubricant film. As observed, the performance of such $MoS_2$ films was practically the same as those of the sprayed films according to the present invention at the room temperature but was markedly impaired with rise of the ambient temperature. In contrast, the life of sprayed ceramic films according to the present invention was generally extended with temperature rise. In the case of the films of No. 7 material, which exhibits excellent low-temperature characteristics, the film life was slightly increased at 350° C. but was markedly reduced at higher temperatures. Similarly, the films of No. 6 material, which also exhibits excellent low-temperature characteristics, had a more or less extended life at 660° C. but with further rise of temperature the life was gradually reduced. In this graphical illustration, the dotted edge lines at the right-hand end of some of the horizontal bars indicate that the films of the corresponding materials withstand further rubbing cycles.

It will be appreciated from the foregoing that bearing elements of stainless steel spray-coated with molybdenum trioxide are highly excellent in friction coefficient and wear resistance characteristic over a wide temperature range of from room temperature to 800° C. or over and that, by use of an appropriate additive or additives, different characteristics can be imparted to spray-coated films obtained in conformity with the respective conditions of use while expediting the spraying operation.

What is claimed is:

1. A bearing element formed of iron-base metal and carrying on the surface thereof a spray-coated film of a material consisting essentially of molybdenum trioxide as a principal ingredient and a total of not more than 20%, by weight, of additives including not more than 15%, by weight, of vanadium pentoxide and not more than 5%, by weight, of silicon dioxide.

2. A bearing element formed of iron-base metal and carrying on the surface thereof a spray-coated film of a material consisting essentially of molybdenum trioxide as a principal ingredient, and an additive mixture not more than 10%, by weight, of lead oxide and from 5 to 10%, by weight, of triiron tetroxide.

3. A bearing element formed of iron-base metal and carrying on the surface thereof a spray-coated film of a material consisting of molybdenum trioxide as a principal ingredient and a few percent up to not more than 10% by weight, of calcium fluoride as an additive.

4. A bearing element formed of iron-base metal and carrying on the surface thereof a spray-coated film of a material consisting essentially of molybdenum trioxide as a principal ingredient and from 3% to not more than 15% by weight of vanadium pentoxide as an additive.

References Cited

UNITED STATES PATENTS

| 3,081,196 | 3/1963 | MacDonald | 117—127 |
| 3,198,735 | 8/1965 | Lamson et al. | 250—30 |
| 3,370,006 | 2/1968 | Campbell | 252—12 |

FOREIGN PATENTS

| 910,621 | 11/1962 | Great Britain. |
| 967,937 | 8/1964 | Great Britain. |

WILLIAM D. MARTIN, Primary Examnier

R. M. SPEER, Assistant Examiner

U.S. Cl. X.R.

117—16, 23, 127, 135.1

UNITED STATES PATENT OFFICE
CERTIFICATE OF CORRECTION

Patent No. 3,514,319                    Dated May 26, 1970

Inventor(s) Toshio Hata et al.

It is certified that error appears in the above-identified patent and that said Letters Patent are hereby corrected as shown below:

In column 1 of the above patent, immediately below the title, in the inventor identification, add --assigned to Oiles Kogyo Kabushiki Kaisha of 10, Nishikubo-Akefune-cho, Shiba, Minato-ku, Tokyo, Japan --

SIGNED AND
SEALED
OCT 27 1970

(SEAL)
Attest:

Edward M. Fletcher, Jr.
Attesting Officer

WILLIAM E. SCHUYLER, JR.
Commissioner of Patents